United States Patent [19]
Copeland

[11] 3,825,088
[45] July 23, 1974

[54] EQUALIZER BAR MOUNTING FOR TRACK-TYPE VEHICLES

[75] Inventor: Kermit L. Copeland, Bellevue, Ill.

[73] Assignee: Caterpillar Tractor Co., Peoria, Ill.

[22] Filed: Dec. 7, 1972

[21] Appl. No.: 312,819

[52] U.S. Cl. ............................................. 180/9.5
[51] Int. Cl. ......................................... B62d 55/08
[58] Field of Search .................... 180/9.5, 9.54, 9.6

[56] References Cited
UNITED STATES PATENTS

| | | | |
|---|---|---|---|
| 1,913,705 | 6/1933 | Erdahl | 180/9.6 |
| 1,941,011 | 12/1933 | Johnston | 180/9.6 |
| 2,988,159 | 6/1961 | Weber | 180/9.5 |
| 3,687,226 | 8/1972 | Coyne | 180/9.5 |

*Primary Examiner*—Richard J. Johnson
*Attorney, Agent, or Firm*—Phillips, Moore, Weissenberger Lempio & Strabala

[57] ABSTRACT

The undercarriage of a track-type vehicle comprises a pair of endless tracks each mounted on a track roller frame. An equalizer bar is pivotally mounted at the longitudinal axis of the vehicle and each end thereof is connected to a respective one of the track roller frames by a lost-motion connection. Such connection comprises a pin attached to a respective end of the equalizer bar and disposed in parallel relationship with respect to the vehicle's longitudinal axis and at least one pair of parallel bearing blocks mounted on either side of the pin.

12 Claims, 5 Drawing Figures

3,825,088

EQUALIZER BAR MOUNTING FOR TRACK-TYPE VEHICLES

BACKGROUND OF THE INVENTION

Conventional track-type tractors comprise a main frame having a pair of endless track assemblies, each mounted on a track roller frame. Each track roller frame is normally mounted on the main frame by a drive sprocket shaft to permit the track roller frames to oscillate thereabout during tractor operation. Substantial side loads are imposed on the forward ends of the track roller frames during various tractor operations, such as a bulldozing operation or when the tractor encounters rocks or other obstacles during a turning maneuver. Such side loads, acting through long moment arms of the track roller frames, are transmitted to the support bearings for the drive sprocket shafts and to the final tractor drive to oftentimes cause premature failure thereof.

The advent of equalizer bars, pivotally mounted on a forward end of the tractor's main frame, has helped to alleviate such problem. The ends of a conventional equalizer bar are normally pivoted to the track roller frames and thus move the frames in an arcuate path about the longitudinal axis of the tractor when the frames oscillate during tractor operation. Such connections tend to pull the forward ends of the track roller frames inwardly towards each other (toe-in) while the equalizer bar is simultaneously pulled rearwardly by the frames. Various mechanisms have been proposed for connecting the equalizer bar to the tractor's main frame and to the track roller frames to accommodate such compound angular misalignment. For example, attention is directed to U.S. Pat. Nos. 2,063,035; 2,557,853; 2,786,724; 2,936,841; 2,988,159; 3,576,226; and 3,687,226.

SUMMARY OF THIS INVENTION

An object of this invention is to overcome the above briefly described problems by providing a non-complex and economical equalizer bar mounting for track-type vehicles which substantially compensates for compound angular misalignments occurring between the equalizer bar and attached track roller frames during vehicle operation. The equalizer bar is mounted on a main frame of the vehicle for pivotal movement about a longitudinal axis thereof and a lost-motion connection operatively connects each end of the equalizer bar to a respective track roller frame for permitting such ends to move in arcuate paths relative to the track roller frames.

BRIEF DESCRIPTION OF THE DRAWINGS

Other objects of this invention will become apparent from the following description and accompanying drawings wherein.

DETAILED DESCRIPTION

Figure 1:
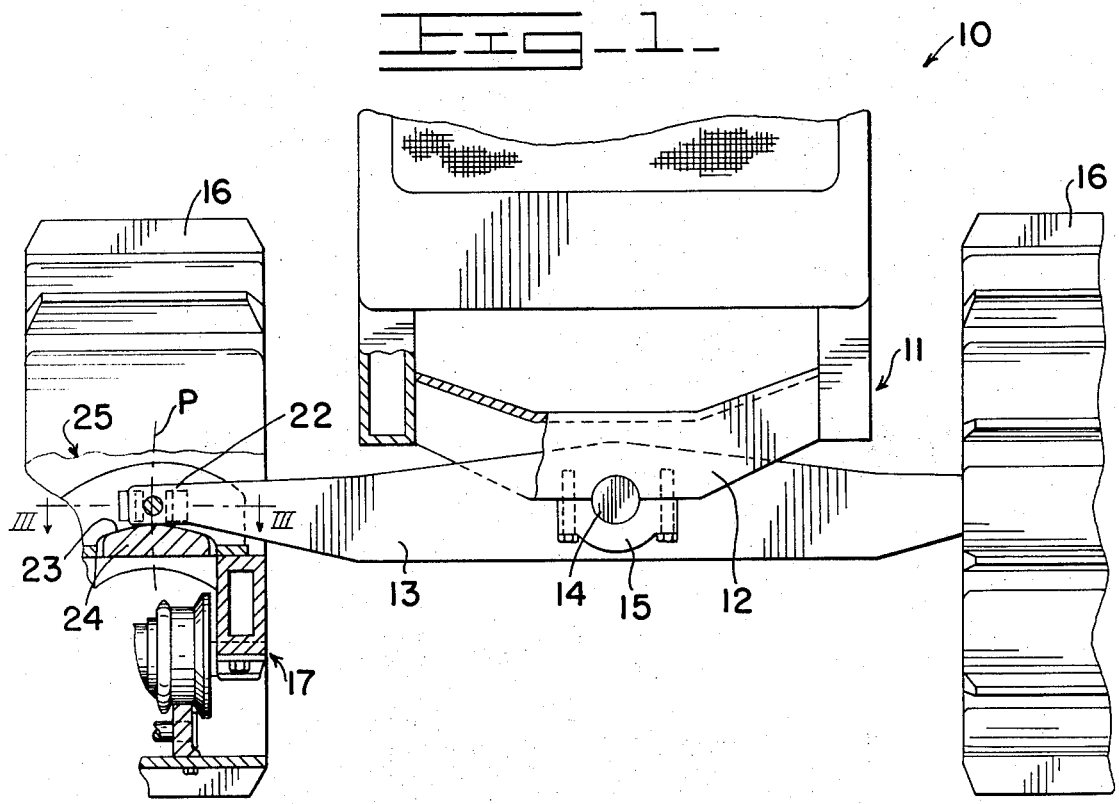
FIG. 1 is a partial, front elevational view of a track-type tractor with portions thereof broken-away to clearly illustrate an equalizer bar mounting of this invention.

FIG. 1 illustrates a track-type vehicle 10, such as a tractor, disposed for movement along a longitudinal axis thereof. The vehicle comprises a main frame 11 having a transversely extending saddle member 12 of inverted U-shaped cross section integrally secured thereon. An equalizer bar 13 is mounted adjacent to a forward end of the main frame for pivotal movement about the longitudinal axis of the vehicle by a pivot pin 14, having its ends secured to the saddle member by longitudinally spaced bearing caps 15 (one shown). A pair of endless track assemblies 16, each mounted on a track roller frame 17, are disposed on opposite sides of main frame 11 (FIG. 2).

Figure 2:
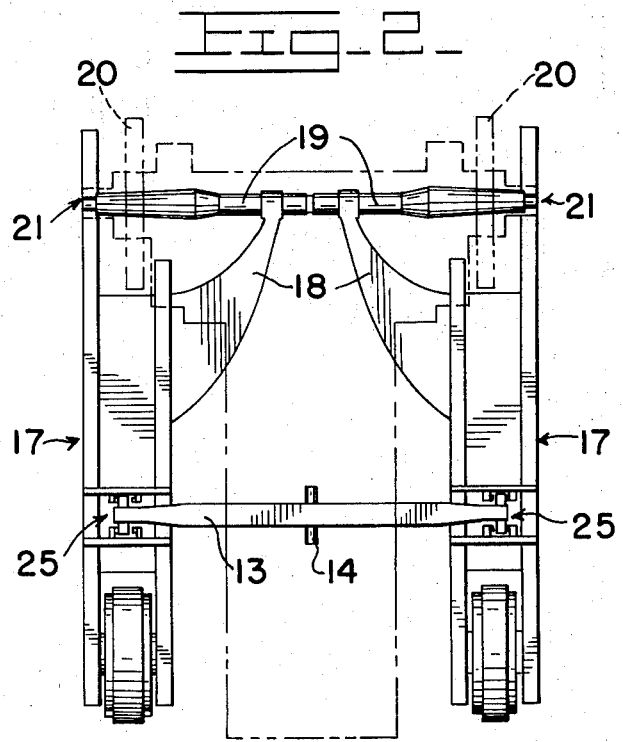
FIG. 2 is a reduced, top elevational view of an undercarriage of the vehicle with parts removed for clarification purposes.

FIG. 2 is a top plan view of the vehicle's undercarriage with the track assemblies removed therefrom to clearly illustrate the equalizer bar in relation to the vehicle's final track drive. A pair of brackets 18 are secured to a rearward end of frame 11 to support a pair of drive shafts 19 of the track drive thereon. The drive shafts comprise drive sprockets shaft means providing the power input to sprockets 20 which engage and drive the tracks in a conventional manner. In addition, track roller frames 17 are pivotally mounted on the outboard ends of the drive shafts at pivotal connections 21.

Each end 22 of equalizer bar 13 rests on an arcuate top surface 23 of a support pad 24 and is operatively connected to a respective one of the track roller frames by a lost-motion connection means 25 for permitting slight universal movement therebetween during vehicle operation (FIG. 1). As more clearly shown in FIGS. 3 and 4, each lost-motion connection means comprises a horizontally disposed guided member or pin 26 secured to end 22 of the equalizer bar and positioned between vertically disposed and parallel guide means secured to a track roller frame.

The guide means preferably comprises opposed bearing surfaces of two sets of longitudinally spaced pairs of bearing pads 27 and 28, each detachably mounted by a pair of bolts 29 to a bracket 30. The bracket is adjustably mounted on a respective track roller frame for movement perpendicular to the longitudinal axis of the vehicle by a slot 31 and a bolt 32, positioned at each corner of the bracket. Such adjustment will precisely set a working clearance 33, between pin 26 and the two inboard bearing pads 27 and 28. Alternatively, bracket 30 could be secured to the track frame and the blocks carrying pads 27 and 28 could be adjustably mounted on the bracket by suitable bolt and slot connections (not shown).

Figure 5:
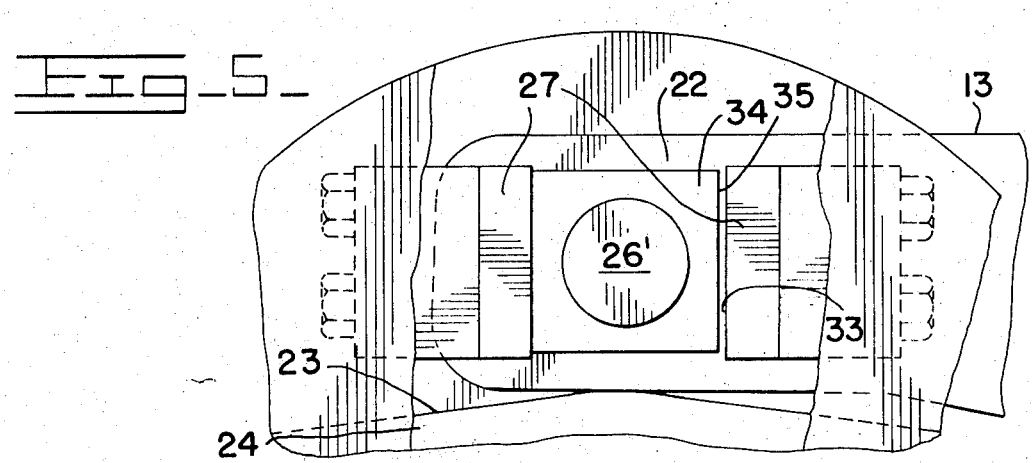
FIG. 5 is an enlarged side elevational view of a modified form of the lost-motion connection.

FIG. 5 illustrates a modification of lost-motion connection means 25 wherein a rectangular bearing block 34 is secured on a pin 26' attached to end 22 of the equalizer bar. Such bearing block thus provides substantial, flat surface areas 35 thereon to define a working clearance 33 between the two inboard bearing pads 27 and 28 and such surface areas.

During operation of the vehicle, side loads imposed on a track roller frame will be transmitted to main frame 11 and to the other track roller frame through bearing pads 27 and 28, pin 26 and equalizer bar 13 to limit the toe-in of the track roller frames relative to the main frame. When the vehicle travels over uneven terrain, for example, the forward end of one of the track roller frames may swing downwardly while the other track roller frame will pivot upwardly due to their common connection by equalizer bar 13. As the track roller frames move in opposite directions relative to each other, the equalizer bar will pivot about pin 14 to in turn cause pins 26 (or 26') to travel in an arcuate path P (FIG. 1) about pivot pin 14.

Such movement will slightly decrease the lateral spacing between the pins and the main frame. Lost-motion space 33 accommodates a substantial portion of such decrease, although a slight toe-in effect may occur at the extreme limits of path P. However, such toe-in will be absorbed by sprocket drive shafts 19 without detrimentally affecting the attendant support bearings.

Figure 3:
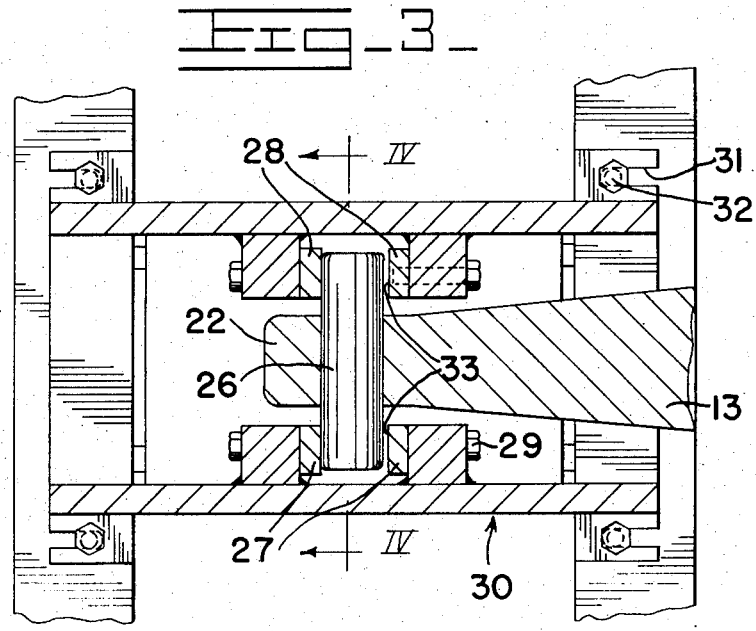
FIG. 3 is an enlarged sectional view of a lost-motion connection employed in the equalizer bar mounting, taken in the direction of arrows III—III in FIG. 1.
Figure 4:
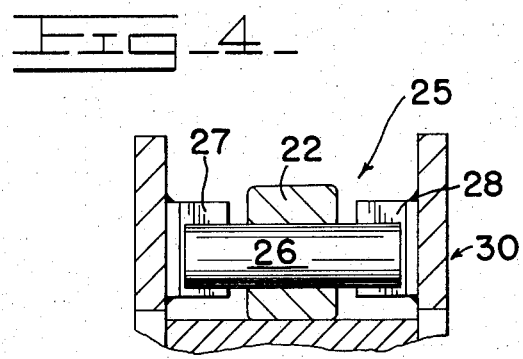
FIG. 4 is a cross sectional view of the lost-motion connection, taken in the direction of arrows IV—IV in FIG. 3 but turned to front elevation.

During oscillation of the track roller frames, bearing pads 27 and 28 will swing in a vertical arc and move slightly rearwardly relative to the equalizer bar. However, sufficient space is provided longitudinally between the bearing pads and the equalizer bar and between pin 26 and bracket 30 to accommodate such rearward movement (FIG. 3). Therefore, it can be seen that lost-motion connection means 25, permitting universal movement of the pins relative to the track roller frames, provide relatively stress-free connections during all phases of vehicle operation.

What is claimed is:

1. A track-type vehicle disposed for movement along a longitudinal axis thereof comprising
a main frame,
an equalizer bar mounted on said main frame for pivotal movement about said longitudinal axis,
a pair of endless track assemblies mounted on track roller frames disposed on opposite sides of said main frame in parallel relationship to said longitudinal axis, and
lost-motion connection means, including a guided member secured to and extending parallel to said longitudinal axis away from each end of said equalizer bar, operatively connecting each end of said equalizer bar to a respective one of said track roller frames for permitting said ends to move in arcuate paths, about said longitudinal axis, relative to said track roller frames, said lost-motion connection means further comprising at least one pair of vertically disposed and parallel guide means detachably mounted on a bracket adjustably mounted on each one of said track roller frames for adjustment in a direction perpendicular to the longitudinal axis of said vehicle and wherein each guided member is horizontally disposed and positioned between a pair of respective guide means for universal movement therein, each pair of guide means and a respective guided member being disposed at least substantially parallel to the longitudinal axis of said vehicle.

2. A track-type vehicle disposed for movement along a longitudinal axis thereof comprising
a main frame,
an equilizer bar mounted on said main frame for pivotal movement about said longitudinal axis,
a pair of endless track assemblies mounted on track roller frames disposed on opposite sides of said main frame in parallel relationship to said longitudinal axis, and
lost-motion connection means, including a guided member secured to each end of said equalizer bar and loosely mounted in unattached relationship between at least one pair of vertically disposed and parallel guide means secured to each one of said track roller frames for universal movement therebetween, operatively connecting each end of said equalizer bar to a respective one of said track roller frames for permitting said ends to move in arcuate paths, about said longitudinal axis, relative to said track roller frames, each guided member extending horizontally from said bar and each pair of guide means and a respective guided member being disposed at least substantially parallel to the longitudinal axis of said vehicle.

3. The vehicle of claim 2 wherein said equalizer bar is mounted adjacent to a forward end of said main frame and further comprising drive sprocket shaft means mounted adjacent to a rearward end of said main frame and pivotally mounting said track roller frames thereon.

4. The vehicle of claim 1 wherein said guided member is spaced slightly from the surface of an inboard one of said guide means to define a working clearance therebetween.

5. The vehicle of claim 1 wherein said guide means are each detachably mounted on a respective one of said track roller frames.

6. The vehicle of claim 5 wherein said guide means are detachably mounted on a bracket, said bracket adjustably mounted on a respective one of said track roller frames for adjustment in a direction perpendicular to the longitudinal axis of said vehicle.

7. The vehicle of claim 1 wherein said guide means comprise opposed surfaces of a pair of bearing pads.

8. The vehicle of claim 7 wherein two sets of said pair of said bearing pads and spaced longitudinally from each other, an end of said equalizer bar positioned between said sets.

9. The vehicle of claim 7 wherein said guided member comprises a pin.

10. The vehicle of claim 7 wherein said guided member comprises a bearing block, said bearing block having parallel bearing surfaces formed thereon in parallel relationship to the bearing surfaces of said bearing pads.

11. The vehicle of claim 10 wherein an inboard one of said bearing pads is spaced slightly from said bearing block to define a working clearance therebetween.

12. A track-type vehicle disposed for movement along a longitudinal axis thereof comprising
a main frame,
an equalizer bar mounted on said main frame for pivotal movement about said longitudinal axis,
a pair of endless track assemblies mounted on track roller frames disposed on opposite sides of said main frame in parallel relationship to said longitudinal axis, and
lost-motion connection means, including a guided member secured to each end of said equalizer bar and extending forward and rearward thereof, operatively connecting each end of said equalizer bar to a respective one of said track roller frames for permitting said ends to move in arcuate paths, about said longitudinal axis, relative to said track roller frames, said lost-motion connection means further comprising two sets of longitudinally spaced bearing pads, each set having vertically disposed and parallel surfaces, secured to each one of said track roller frames and wherein an end of each guided member is horizontally disposed and positioned between a respective set of bearing pads for universal movement therein, each set of bearing pads and a respective end of each guided member being disposed at least substantially parallel to the longitudinal axis of said vehicle.

* * * * *